(12) United States Patent
Rajaee et al.

(10) Patent No.: US 8,493,092 B2
(45) Date of Patent: Jul. 23, 2013

(54) LINEAR EQUALIZER

(75) Inventors: Omid Rajaee, San Diego, CA (US); Ting Wu, Tianjin (CN); Kambiz Kaviani, Palo Alto, CA (US); Jason Chia-Jen Wei, San Jose, CA (US)

(73) Assignee: Rambus, Inc., Sunnyvale, CA (US)

( * ) Notice: Subject to any disclaimer, the term of this patent is extended or adjusted under 35 U.S.C. 154(b) by 0 days.

(21) Appl. No.: 13/449,975

(22) Filed: Apr. 18, 2012

(65) Prior Publication Data
US 2012/0263223 A1  Oct. 18, 2012

Related U.S. Application Data

(60) Provisional application No. 61/476,526, filed on Apr. 18, 2011.

(51) Int. Cl.
*H03K 19/094* (2006.01)
*H03K 19/0175* (2006.01)

(52) U.S. Cl.
USPC ............ 326/86; 326/83; 326/88; 326/92

(58) Field of Classification Search
None
See application file for complete search history.

(56) References Cited

U.S. PATENT DOCUMENTS

| | | | |
|---|---|---|---|
| 6,005,414 A * | 12/1999 | Reay | 326/83 |
| 6,670,833 B2 | 12/2003 | Kurd et al. | 327/156 |
| 6,919,742 B1 * | 7/2005 | McGlinchey | 327/108 |
| 7,764,083 B2 | 7/2010 | Broyde et al. | 326/30 |
| 8,149,024 B2 * | 4/2012 | Liu et al. | 327/108 |
| 2009/0315627 A1 | 12/2009 | Bereza et al. | 331/2 |

OTHER PUBLICATIONS

Hossain, Masum et al., "CMOS Oscillators for Clock Distribution and Injection-Locked Deskew" IEEE Journal of Solid-State Circuits, vol. 44, No. 8, pp. 2138-2153, Aug. 2009. 16 pages.

Zhang, Lin et al., "Active Deskew in Injection-Locked Clocking" IEEE 2008 Custom Integrated Circuits Conference (CICC), Sep. 21-24, 2008, pp. 567-570. 4 pages.

Kim, Jeong-Kyoum et al., "A Fully Integrated 0.13-um CMOS 40-Gb/s Serial Link Transceiver", IEEE Journal of Solid-State Circuits, vol. 44, No. 5, May 2009. 12 Pages.

Choi, Yongjin et al., "Multimode transceiver for High-Density Interconnects: Measurement and Validation", IEEE 2010 Electronic Components and Technology Conference. 6 Pages.

* cited by examiner

*Primary Examiner* — Anh Tran
(74) *Attorney, Agent, or Firm* — Mahamedi Paradice Kreisman LLP; Lance M. Kreisman

(57) ABSTRACT

A linear equalizer (LEQ) includes a first transconductance device coupled to an input node of the LEQ and a second transconductance device AC coupled to the input node of the LEQ to increase a gain of the LEQ for data signals above a predetermined frequency. The first transconductance device and the second transconductance device are of complimentary types. A bimodal LEQ includes inputs to control operation of the bimodal LEQ in a current mode or a voltage mode. The bimodal LEQ includes first and second transconductance devices. One of the first and second transconductance devices is AC coupled to an input node to increase the gain for data signals above a predetermined frequency.

37 Claims, 10 Drawing Sheets

LINEAR EQUALIZER

RELATED APPLICATIONS

This application claims the benefit of priority under 35 U.S.C. 119(e) to Provisional Application Ser. No. 61/476, 526, filed Apr. 18, 2011, titled LINEAR EQUALIZER, which is incorporated herein by reference in its entirety.

BACKGROUND

System memory bandwidth is one of the key limitations of high performance computing. System memory bandwidth includes the bandwidth of transmission lines between a processor and memory devices, such as DRAMs. Total memory bandwidth can be increased by increasing the per link data rate of the transmission lines. However, bandwidth limitations in each link should be compensated to enable high speed signaling. This can be done by using a linear equalizer (LEQ) to receive the signals. An LEQ adds a filter that ideally has the inverse characteristics of the transmission line to extend the frequency range with the flat frequency response and thereby increase the overall bandwidth.

Traditional LEQs incorporate amplifiers with loading characteristics which degenerate the gain at low frequencies or boost it at high frequencies for obtaining peaking at the desired Nyquist frequency. Unfortunately, these schemes are power hungry as well as not very effective at very high data rates.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. Also, the embodiments may be used together in various combinations. In some instances, well known methods and structures have not been described in detail so as not to unnecessarily obscure the description of the embodiments.

1. Overview

According to an embodiment, an LEQ architecture is provided that exhibits enhanced characteristics in terms of performance and power dissipation and is operable to provide equalization for high speed data signals. The LEQ uses complimentary devices, such as PMOS and NMOS devices, to boost transconductance as well as output load resistance at high frequencies or other desired frequencies. The increased transconductance and output impedance significantly improves peaking at high frequencies to allow for higher data rate signaling, such as greater than or equal to 32 Gigabits per second (Gbps). Furthermore, the improved peaking at high frequencies is achieved without increasing power consumption or sacrificing low frequency performance.

In one embodiment, the LEQ is used for transmitting data at high frequencies in a memory system. For example, the LEQ may be used in a memory controller to receive data at high speeds from DRAM modules.

In another embodiment, the LEQ is provided as a bimodal LEQ. The bimodal LEQ may be used for both current mode and voltage mode signaling. Current mode and voltage mode signaling are two different types of signaling that are frequently used in a memory interface. To accommodate both types of signaling, conventional design might call for using two different receivers, such as one for current mode signaling and one for voltage mode signaling. Using two different receivers increases design complexity, area consumption, signal routing, and power dissipation. The bimodal LEQ, according to the embodiment, accommodates both types of signaling in a single receiver and thus enables a power and area-efficient high-performance bimodal receiver providing linear equalization. Still more specifically, the description below provides a bimodal LEQ that permits a single circuit to support deployment for a current-mode receiver with a high common mode voltage as well as a voltage-mode receiver with low common mode voltage. The principles provided herein are optionally extended to other systems as well, e.g., low common mode voltage for current-mode signaling and high common mode voltage for voltage-mode signaling.

2. LEQ

Figure 1:
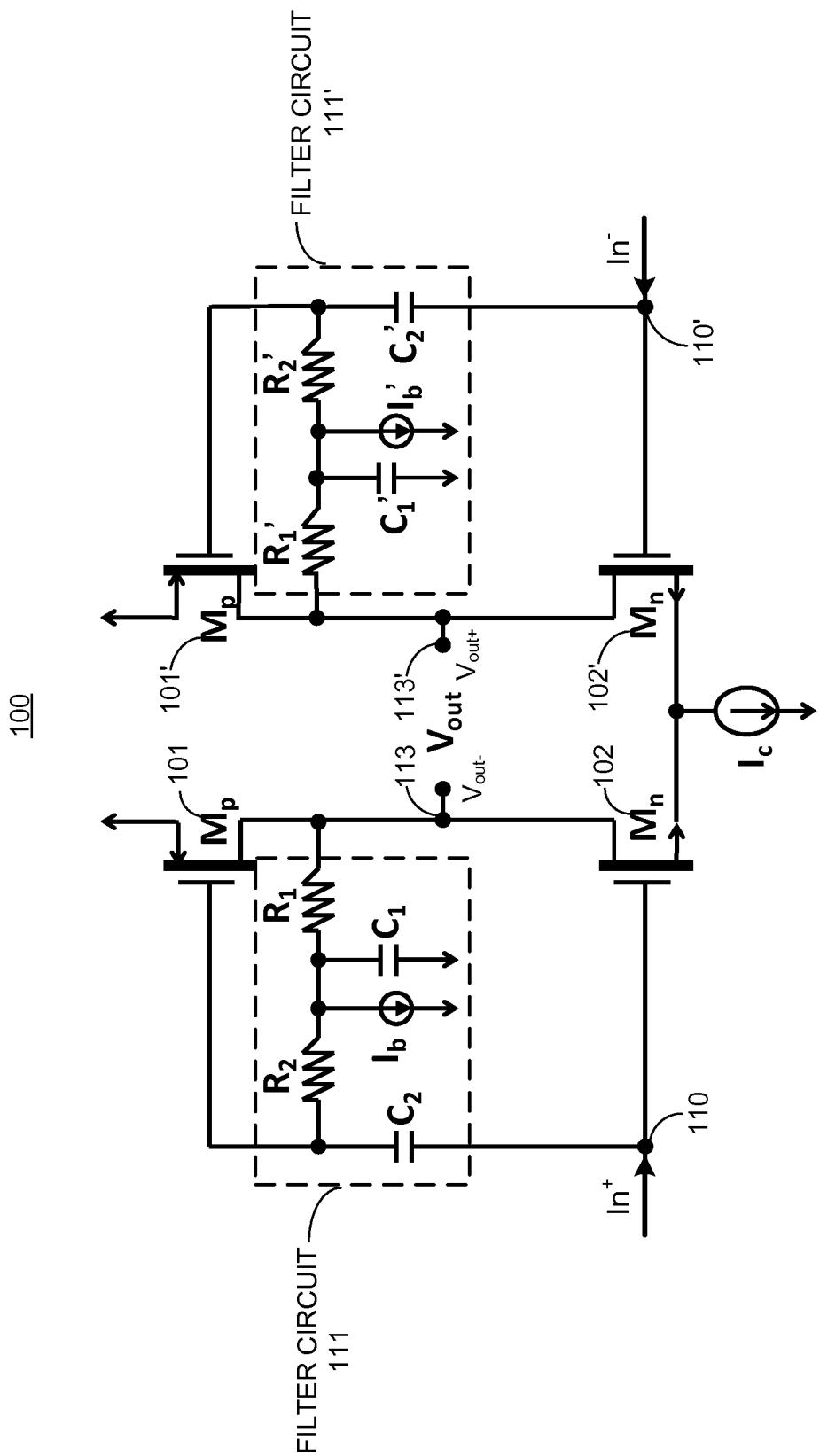
FIG. 1 illustrates an LEQ.

FIG. 1 illustrates an LEQ 100, according to an embodiment. The LEQ 100 includes transconductance devices 101 and 102. The transconductance devices 101 and 102 may be MOSFETs or other electronic devices that exhibit a transconductance. Transconductance is the ratio of the current change at the output port to the voltage change at the input port. For FETs, transconductance is the change in the drain/source current divided by the change in the gate/source voltage with a constant drain/source voltage. According to an embodiment, the transconductance devices 101 and 102 are complementary types. The complementary types include two different types of active devices, such as an NMOS device and a PMOS device. Transconductance device 101, for example, is a PMOS transistor used in a pull-up subcircuit and transconductance device 102, for example, is an NMOS transistor used in a pull-down subcircuit. The LEQ 100 also includes an input node 110, an output node 113, and a filter circuit 111 including AC coupling capacitor (labeled $C_2$, further described below). Also, the LEQ 100 also includes current sources $I_b$ and $I_c$. An example of a simple current source that may be used both for $I_b$ and $I_c$ is a voltage source in series with a resistor.

The embodiments of LEQs described herein include a high voltage rail (e.g., $V_{dd}$) and a low voltage rail (e.g., a ground rail). Arrows facing up in the figures represent a connection to the high voltage rail and arrows facing down represent a connection to a low voltage rail.

The LEQ 100 is a differential LEQ. Differential signaling uses two lines for each signal, with each logic level encoded as a difference between the two signal lines. For example, a logic level of "1" can be represented as a high voltage on a first of the two signal lines and a low voltage on a second of the two signal lines, and vice versa for a logic level of "0". That is, the signal is interpreted as either a logic "1" or "0" depending upon the polarity of the difference between the signal lines.

For differential signaling, the LEQ 100 uses the same or similar components on the right and left sides for each of the two signal lines associated with a signal. For example, the LEQ 100 also includes complementary type transconductance devices 101' and 102'. The LEQ 100 also includes an input node 110', an output node 113', and a filter circuit 111' including AC coupling capacitor $C_2$. The LEQ 100 receives differential inputs In+ and In− at input nodes 110 and 110'−. $V_{ow}$, representing the equalized output of the LEQ 100, is the voltage difference across output node 113 and output node 113'. The LEQ 100 emphasizes (or equivalently, deemphasizes) the differential input signal on a frequency-dependent basis and presents an equalized differential output signal at the output nodes 113 and 113'. The LEQ 100 allows the amplitude of the input signal at specific frequencies or frequency ranges of a signal spectrum to be increased relative to the amplitude of the input signal at other frequencies. The operation of the LEQ 100 is described with respect to the left side of the LEQ 100 shown in FIG. 1, and it is apparent to one of ordinary skill in the art that the right side of the LEQ 100 operates in the same manner to provide the differential output signal at output nodes 113 and 113'.

The LEQ 100 uses the complimentary transconductance devices to boost transconductance as well as output load resistance at high frequencies, as is now described. A first transconductance device 101 is AC coupled to the input node 110 via the filter circuit 111 and the AC coupling capacitor $C_2$. For example, the input node 110 is coupled to the input of transconductance device 101 at a frequency of the input signal In+ passed by the filter circuit 111. In this example, the input of the transconductance device 101 is the gate of the PMOS transistor and the output is the drain connected to the output node 113. In one example, the filter circuit 111 includes a high-pass filter that passes high frequencies, e.g., frequencies greater than or equal to or approximately equal to the frequency content of 32 Gbps operation, to additionally invoke the first transconductance device 101 above this frequency. For example, if the input signal is running significantly above 32 Gbps, then the transconductance device 101 is actively coupled to the input node 110 via the AC coupling capacitor $C_2$ (capacitor $C_2$ is then be modeled as a short circuit, i.e., it directly passes frequencies significantly greater than 32 Gbps operation). The effect of this operation is to increase the gain of the output signal of the LEQ 100 at the frequencies passed by capacitor $C_2$, because two transconductance devices 101 and 102 are used to drive signals at these frequencies, and the gain provided by LEQ 100 is then equal to the sum of the gains of the two transconductance devices 101 and 102. Notably, capacitor $C_1$ is selected to pass similar frequencies to capacitor $C_2$, such that there is no feedback path between the drain of the PMOS transistor and the source at these high frequencies, and so that an output resistance of $R_1$ is effectively seen between node $V_{out}$−(or $V_{out+}$) and the low voltage rail.

For relatively low data rate frequencies (e.g., if the input signal is running significantly below 32 Gbps), the AC coupling capacitor $C_2$ inhibits signal stimulus to the transconductance device 101 from the input In+, with the capacitor $C_2$ then also being modeled as an open circuit. Because capacitor $C_1$ also acts as an open circuit at these frequencies given its high cutoff frequency (i.e., similar capacitance value), the drain of the PMOS transistor is as a consequence fed back to the source for these low frequencies, causing the transconductance device 101 to act as a passive device (i.e., it acts as a resistor that provides an output resistance approximately equal to $1/g_{mp}$, where $g_{mp}$ represents the transconductance device 101). In this case, low frequency signal stimulus at the input node In+ sees a gain of approximately $g_{mn}$, whereas high frequency signal stimulus sees a gain of approximately $g_{mn}+g_{mp}$.

Figure 2:
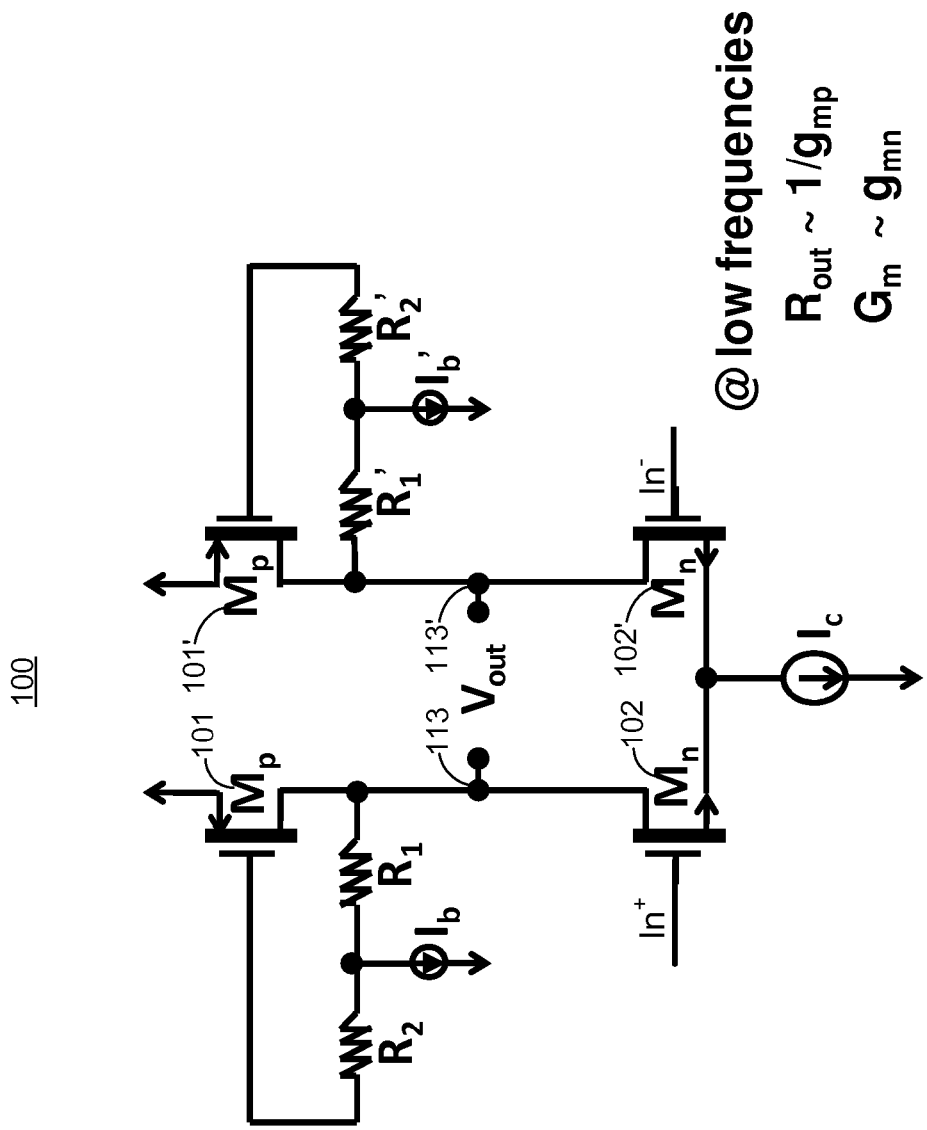
FIG. 2 illustrates a logical representation of the LEQ of FIG. 1 when the input signal is at low frequencies.
Figure 3:
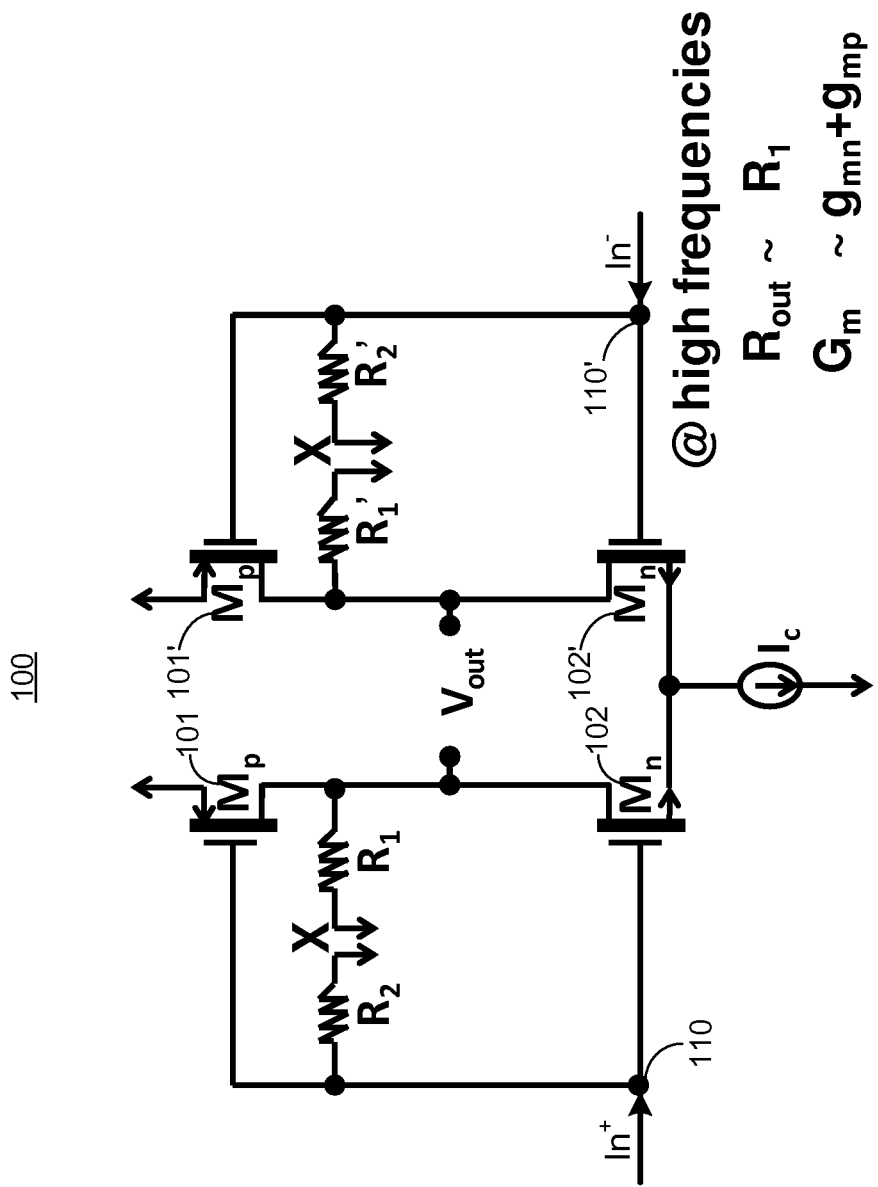
FIG. 3 illustrates a logical representation of the LEQ of FIG. 1 when the input signal is at high frequencies.

The operation of the LEQ 100 is further illustrated in FIGS. 2 and 3, which respectively show low and high frequency equivalent circuits to the circuit depicted in FIG. 1. FIG. 2 shows a representation of the LEQ 100 of FIG. 1 when the input signal In+/In− varies at low frequencies, such as much less than 32 Gbps operation, while FIG. 3 shows a representation of LEQ 100 at high frequencies; that is to say, FIGS. 2 and 3 are equivalent circuit representations, and no components are actually removed from the LEQ of FIG. 1.

In FIG. 2, the first transconductance device 101 is effectively decoupled from the input node 110. For example, at low frequencies (e.g., less than 32 Gbps operation), the AC coupling capacitor $C_2$ and capacitor $C_1$ from FIG. 1 exhibit high impedance and are modeled as open circuits. Thus, as shown in FIG. 2, the gate of the transconductance device 101 is not connected to the input node 110. Current source $I_b$ is connected to the gate via $R_2$ and connected to the drain via $R_1$. The gate-source voltage drop limits the output voltage swing. However, the voltage drop across this resistor $(I_b \times R_1)$ compensates for the gate-source voltage drop.

The output common mode voltage of the LEQ 100 is $V_{out+} = V_{dd} - |V_{gsp}| + R_1 \times I_b$. $V_{gsp}$ is the gate-source voltage drop across the transconductance device 101 and $(I_b \times R_1)$ is the voltage drop across this resistor $R_1$. The output impedance $R_{out}$ of the LEQ 100 is approximately $1/g_{mp}$ where $g_{mp}$ is the transconductance of the transconductance device 101. Regarding the transconductance of the LEQ 100 at low frequencies, the transconductance $G_m$ of the LEQ 100 is approximately the transconductance $g_{mn}$ of the transconductance device 102. The gain provided by the transconductance device 102 is referred to as the DC gain because of the DC coupling of the transconductance device 102 to the input node 110.

FIG. 3 shows a logical representation of the LEQ 100 of FIG. 1 at high frequencies. For example, at these frequencies, the AC coupling capacitor $C_2$ and the capacitor $C_1$ exhibit low impedance and are effectively modeled as short circuits. The AC coupling capacitor $C_2$ thus effectively directly couples the gate of transconductance device 101 to the input node 110 for these frequencies. The "X" shown in FIG. 3 represents the short circuits effectively provided by capacitor $C_1$ at the high frequencies, the effect of which is to couple $R_1$ and $R_2$ to ground. The output impedance $R_{out}$ of the LEQ 100 consequently increases from $1/g_{mp}$ to R1. Furthermore, the coupling of the gate of the transconductance device 101 to the input node 110 increases the transconductance $G_m$ of the LEQ 100 from $g_{mn}$ to $(g_{mn}+g_{mp})$. Thus, the gain of the output signal of the LEQ 100 is increased (relative to the circuit of FIG. 2) by the AC gain of the transconductance device 101.

Increasing both the transconductance and the output impedance improves peaking at the desired Nyquist frequency of the input signal significantly. Peaking refers to the peaks of the input signal identified in a sampling window. The peaks ideally represent the data carried by the input signal. The LEQ 100 increases peaking at high frequencies to differentiate data from noise. In general, the larger the transconductance of the LEQ 100, the greater the gain is for the output signal of the LEQ 100. For the circuit of FIG. 1, the gain approximately doubles when the transconductance device 101 is coupled to the input node 110 at increasingly high frequency. This provides peaking at the high frequencies, which enhances high data rate signaling. Furthermore, the improved gain at the high frequencies is provided without decreasing gain at low frequencies and without the need to increase power at the high frequencies. Conventional approaches typically provide a flat gain at high frequencies and degrade the gain at low frequencies. In contradistinction to the conventional approaches, according to the presented embodiments, at low frequencies, one active device (e.g., transconductance device 102) is used to provide the flat gain, while at high frequencies two active devices (e.g., transconductance devices 101 and 102) are used to increase the gain for the LEQ 100.

Furthermore, the embodiments presented above use complimentary transconductance devices on the same path to increase the gain at high frequencies. In one embodiment, the transconductance device 101 is a PFET and the transconductance device 102 is an NFET. In this embodiment, the drain of the PFET transconductance device 101 is coupled to the output node 113 and the drain of the NFET transconductance device 102 is also coupled to the output node 113 of the LEQ 100. Thus, the transconductance devices 101 and 102 are serially connected on a path from Vdd to ground and use less power when compared to an architecture that uses two amplifiers on parallel paths and uses the same type of active devices to provide the increased gain at higher frequencies.

As mentioned, the filter circuit 111 provides a high-pass filter with a cutoff frequency; by way of illustration in the example provided above, to be around 32 GHz. Other cutoff frequencies can also be used. For example, the cutoff frequency can be selected to be 16 GHz, or some other frequency. This variation in cutoff frequency is effected in the context of FIG. 1 via selection of appropriate values for $R_1$, $R_2$, and $C_1$, $C_2$. For example, a desired high-pass cutoff frequency $\omega_{co}$ can be selected based on $\omega_{co}=1/(R_1 C_1)$. The value of $R_1$ and/or $C_1$ may be selected for the desired cutoff frequency. Furthermore, as indicated above, at high frequencies, the output impedance of the LEQ 100, which is $R_{out}$, increases from $1/g_{mp}$ to $R_1$. By adjusting $R_1$, the output impedance of the LEQ 100 may be modified to account for attenuation. If the value of $R_1$ is selected to control the amount of output impedance of the LEQ 100, then the value of $C_1$ can be selected to control the cutoff frequency.

In one embodiment, the filter circuit 111 is a tunable filter. For example, variable capacitors and/or resistors may be used for one or more of $R_1$, $R_2$, $C_1$, and $C_2$, so a peaking frequency or a peaking value may be modified as needed. Also, these values may be varied to account for process, voltage and temperature (PVT) variations in an integrated circuit (IC). In one embodiment, digitally controlled resistors and/or capacitors may be used to adjust the peaking frequency.

Figure 4:
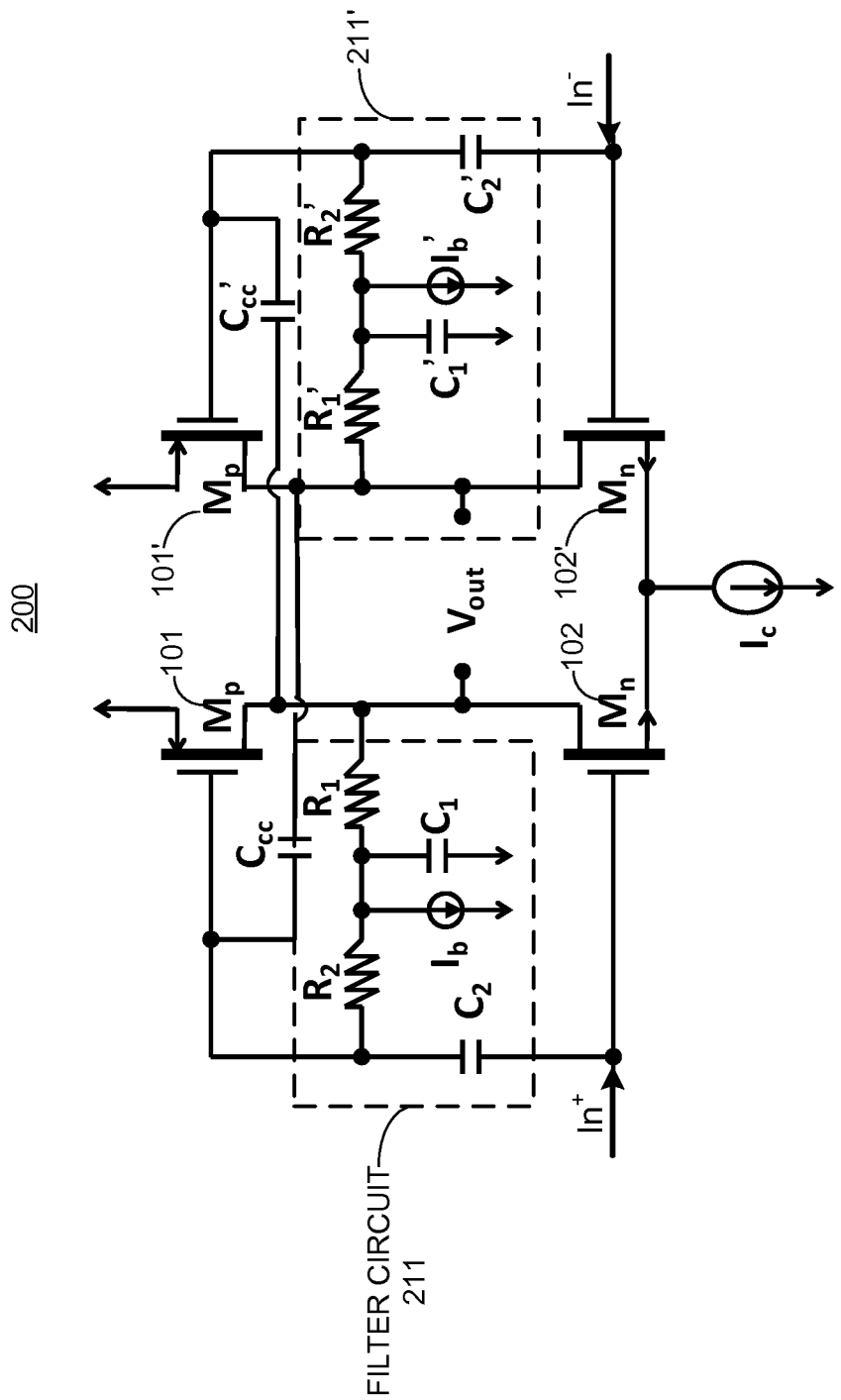
FIG. 4 illustrates an LEQ with cross-coupling capacitors.

Capacitive cross-coupling may be used in the LEQ 100 to further improve high frequency response of transconductance devices by partially cancelling their intrinsic parasitic capacitances which exist between their gate and drain terminals. FIG. 4 shows LEQ 200, which is similar to the LEQ 100 with the addition of cross-coupling capacitors $C_{cc}$ and $C_{cc}'$. Due to the differential nature of the input signal, the cross-coupling capacitors $C_{cc}$ and $C_{cc}'$ suppress the transconductance devices 201' and 201 intrinsic gate-drain parasitic capacitances, respectively.

Figure 5:
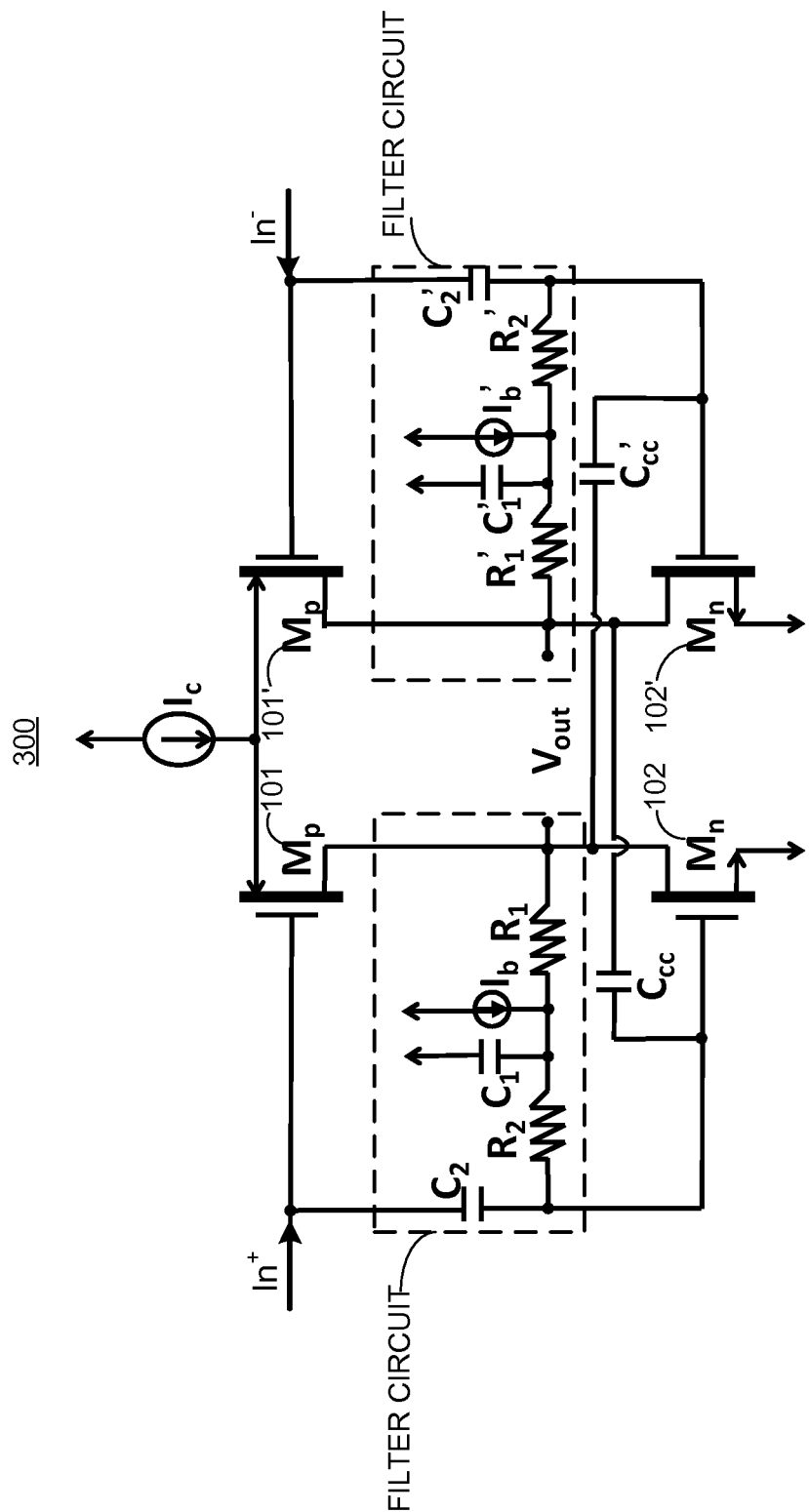
FIG. 5 illustrates an LEQ comprised of a PMOS input pair and NMOS active loads.

The LEQs 100 and 200 shown in FIGS. 1-4 in one embodiment include an NMOS input pair (e.g., transconductance devices 102 and 102') and PMOS active loads (e.g., transconductance devices 101 and 101' and corresponding loads including the filter circuits 111 and 111'). The LEQs 100 and 200 may have a PMOS input pair and NMOS active loads. For example, FIG. 5 shows LEQ 300 comprised of a PMOS input pair and NMOS active loads. In FIG. 5, the PMOS input pair provide the DC gain and the NMOS active loads provide the AC gain at the desired frequency.

Figure 6:
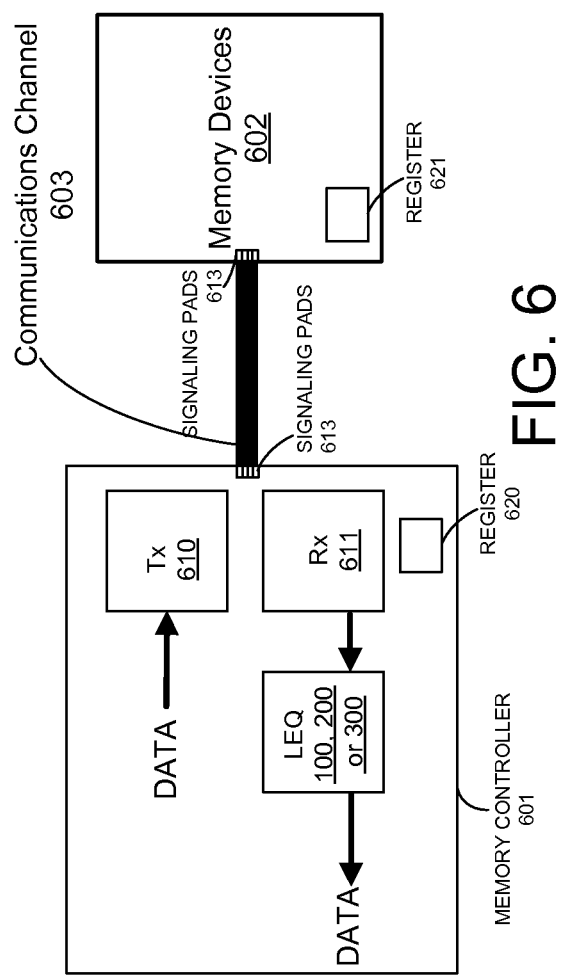
FIG. 6 illustrates a memory system.

According to an embodiment, the LEQs 100-300 may be used in an integrated circuit (IC) in a memory system. The IC may be a memory device, memory controller, or any other IC that communicates digital data with another IC. FIG. 6 shows a memory system 600 including a memory controller 601 that sends and receives data from memory devices 602 via a communication channel 603. The communication channel 603 may be a bus comprised of a plurality lines connecting the memory controller 601 to the memory devices 602. In one example, the memory controller 601 is an IC and each memory devices 602 is an IC, such as a DRAM memory IC. The memory controller 601 includes transmitter 610 for transmitting data to the memory devices 602 and a receiver 611 receiving data from the memory devices 602, each of these using a signaling pad 613 for each line of the bus. The LEQ 100, 200, or 300 may be provided in the memory controller 601 to provide equalization for high frequency data signals received from the memory devices 602. This includes receiving high frequency data input signals on a signaling pad, and increasing the gain of the LEQ at the desired Nyquist frequency of the high frequency data signals as described above. The LEQ 100, 200, or 300 may also be provided in the transmitted 610, for example, in a driver circuit. Also, the LEQ 100, 200, or 300 may be provided in a receiver in the memory devices 602. For example, the LEQ 100, 200, or 300 may be provided in receiver in a DRAM memory integrated circuit, with each integrated circuit (or a memory module) also having a signaling pad 616 used to receive a signal over each line of the bus from the memory controller 601. Each of the memory controller 601 and the each memory device 602 may include a register (620 or 621, respectively) for storing a mode setting in the event the deployed LEQ is operated in one of multiple modes.

3. Bimodal LEQ

Figure 7:
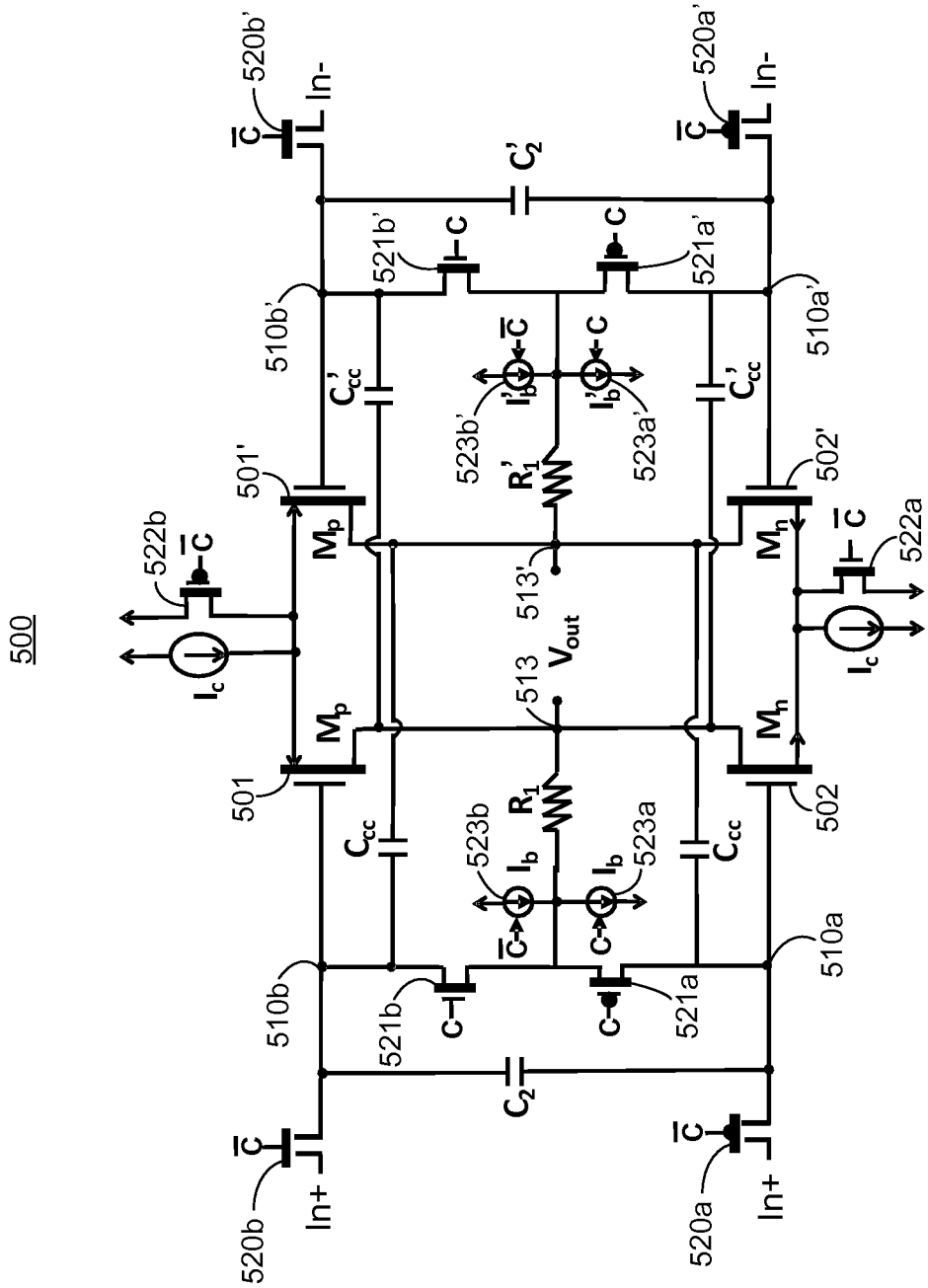
FIG. 7 illustrates a bimodal LEQ.

FIG. 7 shows a bimodal LEQ 500, according to an embodiment. The LEQ 500 is bimodal because it can operate with either current mode or voltage mode received signals. A control signal is transmitted to the bimodal LEQ 500 to control the operational mode of the bimodal LEQ 500. For example, the control signal level may be set to operate the bimodal LEQ 500 in either current mode or voltage mode. The control signal is labeled as C, and $\overline{C}$ represents the inverted control signal in FIG. 7. The inputs of the active devices receiving the control signal are referred to as mode selection inputs.

The bimodal LEQ 500 operates in current mode with near-$V_{dd}$ input common mode voltage when the control signal is high, and it operates in voltage mode with near-ground input common mode voltage when the control signal is low. The operation of the bimodal LEQ 500 is similar to the operation of the LEQs 100 and 200 shown in FIGS. 1-4 when in current mode, and the operation of the bimodal LEQ 500 is similar to the operation of the LEQ 300 shown in FIG. 5 when in voltage mode as is described in detail below.

For example, the input signal In+ is supplied to the bimodal LEQ 500 through transistors 520a and 520b. If the control signal C is set to high to operate the bimodal LEQ 500 in current mode, transistors 520a and 520a' are on and transistors 520b and 520b' are off, and In+ is supplied to the input node 510a but not to the input node 510b. Also, in current mode, transistor 521a is off, transistor 521b is on, transistor 522a is off and transistor 522b is on. Also, in current mode, current source 523a is on and current source 523b is off. Generally, in current mode, the input node 510a of the bimodal LEQ 500 is coupled to an input (e.g., the gate) of the transconductance device 502 and is AC coupled to an input (e.g., the gate) of the transconductance device 501. The output node 513 of the bimodal LEQ 500 is coupled to the output of the transconductance device 501 and an output of the transconductance device 502. The filter circuit in current mode providing the AC coupling at the desired frequency includes $R_1$, current source 523a, transistor 521b and $C_1$ and $C_2$. In current mode, transconductance device 502 provides the DC gain and transconductance device 501 provides the AC gain.

If the control signal C is set to low, to operate the bimodal LEQ 500 in voltage mode, transistor 520a is off and transistor 520b is on, and In+ is supplied to the input node 510b but not to the input node 510a. Also, in voltage mode, transistor 521a is on, transistor 521b is off, transistor 522a is on and transistor 522b is off. Also, in voltage mode, current source 523a is off and current source 523b is on. Generally, in voltage mode, the input node 520b is coupled to the input of the transconductance device 501 and AC coupled to the input of the transconductance device 502. As a result, the transconductance device 501 provides the DC gain and the transconductance device 502 provides the AC gain. The filter circuit in voltage mode includes $R_1$, current source 523b and transistor 521a. The filter circuits may be tunable by using a variable resistor or capacitor.

Similarly to the LEQs 100-300, the bimodal LEQ 500 is a differential LEQ. Accordingly, the LEQ 500 has the same or similar components on the right and left sides and the components operate in generally the same manner.

Figure 8:
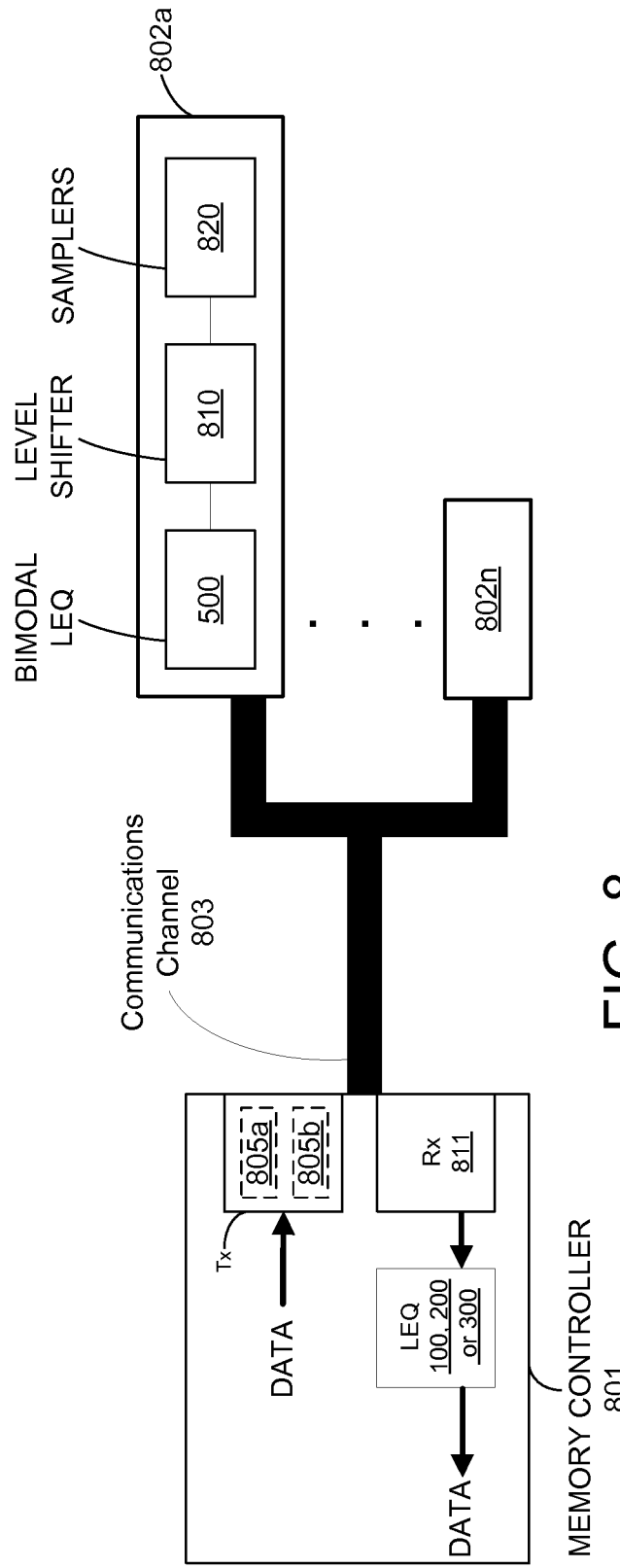
FIG. 8 illustrates a memory system including the bimodal LEQ.

According to an embodiment, the bimodal LEQ 500 may be used in an integrated circuit (IC) in a memory system. The IC may be a memory device, memory controller, or any other IC that communicates digital data with another IC. FIG. 8 shows a memory system 800 that includes the bimodal LEQ 500. The memory system 800 includes memory controller 801 that sends and receives data from memory devices 802 via a communication channel 803, such as a bus comprised of traces. In one example, the memory controller 801 is included in an IC and each memory device is included in an IC.

As shown in FIG. 8, the memory controller 801 includes a current mode transmitter 805a and/or a voltage mode transmitter 805b. The memory controller 801 also includes a receiver 811 connected to an LEQ, such as LEQ 100, 200 or 300. The bimodal LEQ 500 is used in the memory devices 802 to equalize high speed data signals received from the current mode transmitter 805a or the voltage mode transmitter 805b. Components of the memory device 802a that are related to the bimodal LEQ 500 are shown but the components of the memory device 802a are optionally employed in each of the memory devices 802. For example, the memory device 802a includes the bimodal LEQ 500, level shifter 810 and samplers 820. The control signal is provided to the bimodal LEQ to select the mode. For example, if the memory devices 802 are being used with the current mode transmitter 805a, the control signal is provided at a high logic level to select current mode, and if the memory devices 802 are being used with the voltage mode transmitter 805b, the control signal is provided at a low logic level to select voltage mode. The control signal is provided by the memory controller 801 or some other source.

In current mode, received data signals are referenced to $V_{dd}$, and in voltage mode, the signals are referenced to ground. The level shifter 810 operates in both modes to condition the signals to the correct voltage level as needed for subsequent processing. For example, in current mode, the level shifter 810 operates as an amplifier, and in voltage mode, the level shifter 810 amplifies and conditions the signal to the correct voltage level, such that ensuing samplers 820 receive data signals for storage in the memory device 802a at a normalized level irrespective of signaling mode. It will be apparent to one of ordinary skill in the art that the memory system 600 shown in FIG. 6 and the memory system 800 shown in FIG. 8 include many other components not shown. The bimodal LEQ 500 may be used in the memory controller 801 also. For example, the bimodal LEQ 500 is used with the receiver 811 instead of the LEQ 100, 200 or 300 if the received signals are for two modes. Also, the bimodal LEQ 500 may be used with the transmitters 805a and 805b if both transmitters are used in the memory controller 801.

4. Methods

Figure 9:
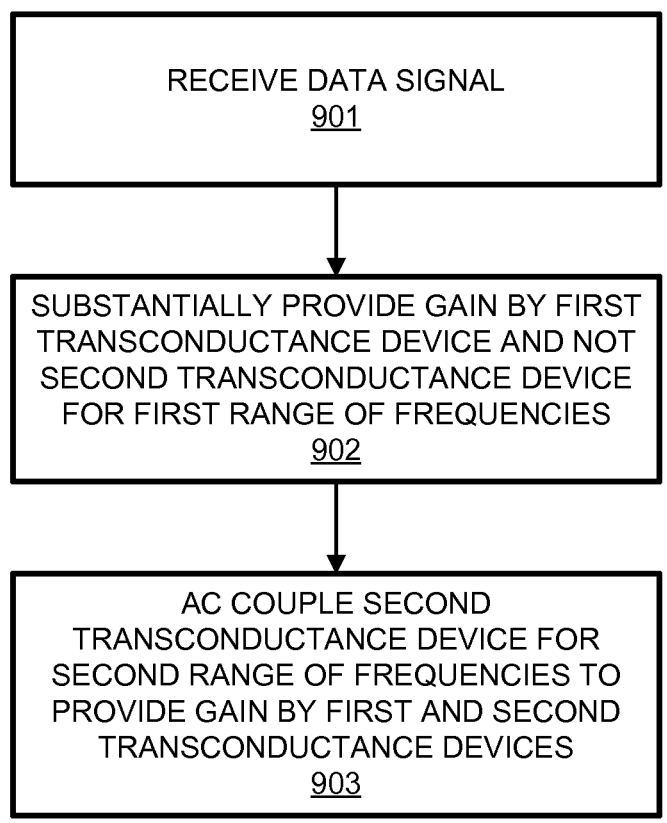
FIG. 9 illustrates a method for equalizing a signal.

FIG. 9 illustrates a method 900 for equalizing a signal, according to an embodiment. The method 900 may be implemented using the LEQ 100, 200, or 300 shown in FIGS. 1-5. Two or more of the steps may be performed in an order other than shown. At step 901, a data signal is received at an input node of the LEQ. At step 902, the LEQ substantially provides gain by the first transconductance device and not by the second transconductance device for a first range of frequencies of the data signal. The first range of frequencies, for example, are a range of frequencies less than the cut of frequency of the filter circuit 111 shown in FIG. 1. The first and second transconductance devices, for example, are transconductance devices 102 and 101 respectively shown in FIG. 1. At step 903, the second transconductance device is AC coupled to the input node for a second range of frequencies of the data signal above a predetermined frequency to substantially provide gain for the data signal by both the first and second transconductance devices. The second range of frequencies for example are greater than or equal to the cut of frequency of the filter circuit 111.

Figure 10:
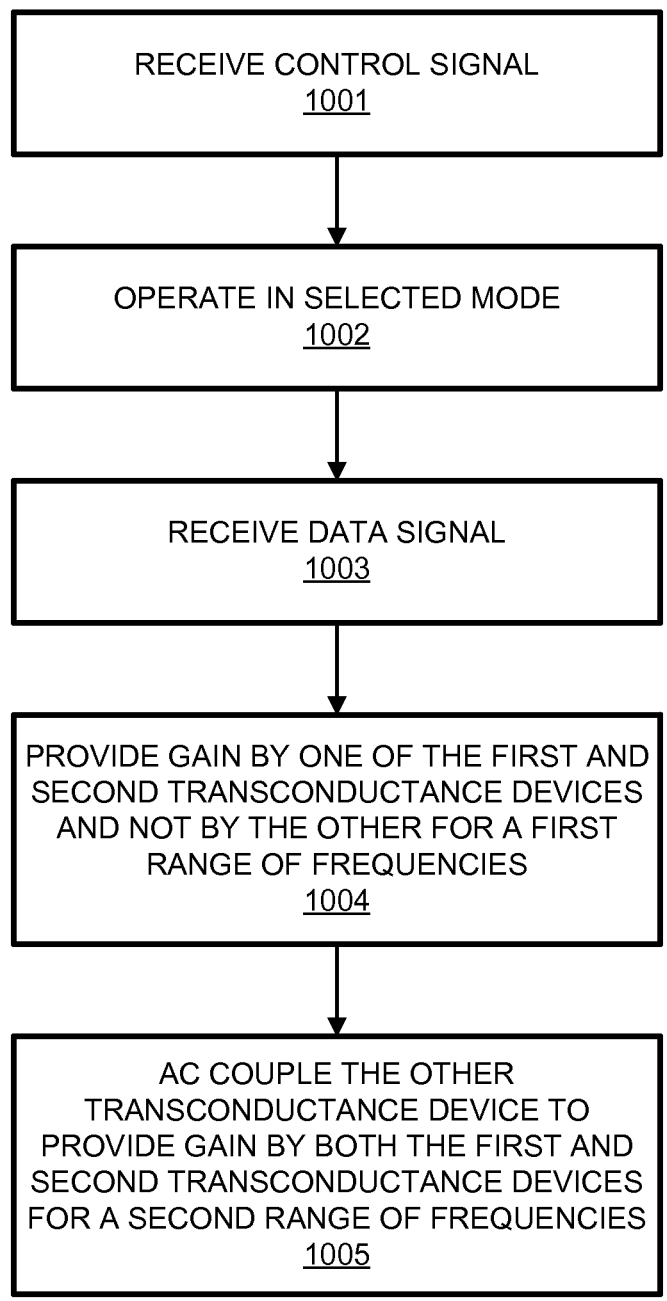
FIG. 10 illustrates a method for bimodal equalization.

FIG. 10 illustrates a method 1000 for bimodal equalization, according to an embodiment. The method 1000 may be implemented using the bimodal LEQ 500 shown in FIGS. 7 and 8. Two or more of the steps may be performed in an order other than shown. At step 1001, a control signal is received to select the mode of the bimodal LEQ 500 as a first mode or a second mode, e.g., a current mode or a voltage mode, respectively. At step 1002, the bimodal LEQ 500 is configured to operate in the selected mode. For example, the control signal may be driven by a setting stored in a register. The setting drives the value "C" to a specific logic level to electrically configure the bimodal LEQ 500 to operate in voltage or current mode. The register is not shown in FIG. 7 (but for example, may correspond to register 620 or 621 seen in FIG. 6); a setting stored in the register may be used to select the mode. If the control signal selects current mode, the bimodal LEQ 500 operates as shown in FIG. 4. If the control signal selects voltage mode, the bimodal LEQ 500 operates as shown in FIG. 5. At step 1003 a data signal is received. At step 1004, the bimodal LEQ substantially provides gain for the data signal by one of the first and second transconductance devices and not by the other one of the first and second transconductance devices based on the selected mode for a first range of frequencies of the data signal. For example, in current mode, the transconductance device 502 shown in FIG. 7 is DC coupled to the input node 510a and the transconductance device 501 is AC coupled to the input node 510a. In voltage mode, the transconductance device 501 shown in FIG. 7 is DC coupled to the input node 510b and the transconductance device 502 is AC coupled to the input node 510b. At step 1005, the other one of the first and second transconductance devices is AC coupled to the input node for a second range of frequencies of the data signal to substantially provide gain for the data signal by both the first and second transconductance devices. For example, the AC coupled transconductance device is coupled to the corresponding input node and increases the gain for high frequency signals.

While the embodiments have been described with reference to examples, those skilled in the art will be able to make various modifications to the described embodiments without departing from the scope of the claimed embodiments.

What is claimed is:

1. A linear equalizer (LEQ) comprising:
   a first transconductance device coupled to an input node of the LEQ; and
   a second transconductance device AC coupled to the input node of the LEQ;
   an output node of the LEQ coupled to the first and second transconductance devices;
   wherein a gain of the LEQ is substantially provided by the first transconductance device and not by the second transconductance device for a first range of frequencies of an input signal received at the input node, and the gain of the LEQ is substantially provided by both the first transconductance device and the second transconductance device for a second range of frequencies of the input signal.

2. The LEQ of claim 1, wherein the first transconductance device and the second transconductance device are of complimentary types.

3. The LEQ of claim 2, wherein the first and second complimentary transconductance devices comprise an NMOS device and a PMOS device, respectively.

4. The LEQ of claim 1, further comprising:
   a filter circuit including an AC coupling capacitor coupling the second transconductance device to the input node at the second range of frequencies, the AC coupling capacitor to discriminate the first range of frequencies from the second range of frequencies.

5. The LEQ of claim 4, wherein the filter circuit comprises a tunable filter to set a cutoff frequency, wherein the second range of frequencies is above the cutoff frequency.

6. The LEQ of claim 1, wherein the LEQ provides peaking at a predetermined Nyquist frequency of the input signal.

7. The LEQ of claim 1, wherein the second range of frequencies comprises frequencies greater than 16 GHz.

8. The LEQ of claim 1, wherein the first transconductance device and the second transconductance device are serially connected on a single path from a high voltage rail to a low voltage rail.

9. The LEQ of claim 8, wherein the first transconductance device is an NFET and the second transconductance device is a PFET, and a drain of the second transconductance device is coupled to a drain of the first transconductance device.

10. The LEQ of claim 9, where the output node is coupled to the drains of the first and second transconductance devices.

11. The LEQ of claim 1, wherein the LEQ is a differential LEQ and the input signal is a differential input signal, and the LEQ receives the differential input signal and outputs a differential equalized signal.

12. The LEQ of claim 1, wherein the LEQ is embodied in an integrated circuit in a memory system.

13. The LEQ of claim 12, wherein the integrated circuit further comprises a DRAM memory device.

14. The LEQ of claim 12, wherein the integrated circuit further comprises a memory controller.

15. An integrated circuit comprising a receiver to receive signals from a signaling pad, the receiver comprising:
   a first transconductance device coupled to an output node; and
   a second transconductance device coupled to the output node,
   wherein gain of an output signal provided at the output node is substantially provided by the first transconductance device and not by the second transconductance device for a first range of frequencies of an input signal received at the signaling pad, and the gain is substantially provided by both the first transconductance device and the second transconductance device for a second range of frequencies of the input signal.

16. The integrated circuit of claim 15, wherein the first transconductance device and the second transconductance device are of complimentary types and are connected in series to drive the output signal.

17. The integrated circuit of claim 16, wherein the first transconductance device includes an NFET and the second transconductance device includes a PFET and a drain of the second transconductance device is coupled to a drain of the first transconductance device and the output node.

18. The integrated circuit of claim 15, wherein the first transconductance device is coupled to an input node receiving the input signal, and the integrated circuit further comprises a filter circuit to AC couple the second transconductance device to the input node at the second range of frequencies to increase the gain at the second range of frequencies.

19. A controller to receive a data signal, the controller comprising an LEQ, the LEQ further comprising:
   a first transconductance device and a second transconductance device to provide gain for the received data signal; and
   an input node to receive the data signals, wherein the second transconductance device is AC coupled to the input node to increase the gain provided by the LEQ for the received data signal above a predetermined frequency.

20. The controller of claim 19, wherein the first transconductance device and the second transconductance device are of complimentary types and are connected in series to drive an output signal.

21. The controller of claim 20, wherein the first transconductance device includes an NFET and the second transconductance device includes a PFET, and a drain of the second transconductance device is coupled to a drain of the first transconductance device and an output node of the LEQ.

22. The controller of claim 19, wherein the controller is a memory controller to send and receive the data signals from a DRAM memory device.

23. The controller of claim 19, wherein the controller is to receive data signals over each one of plural parallel lines of a data bus, the controller further comprising an instance of said LEQ for each one of the plural parallel lines.

24. A method of increasing gain of data signals using first and second transconductance devices in an LEQ, the method comprising:
   receiving the data signals at an input node of the LEQ, wherein the first and second transconductance devices are coupled to the input node;
   the LEQ substantially providing gain of the data signals by the first transconductance device and not by the second transconductance device for a first range of frequencies of the data signal; and
   coupling the second transconductance device to the input node for a second range of frequencies of the data signal above a predetermined frequency to substantially provide gain for the data signal using both the first transconductance device and the second transconductance device.

25. A bimodal LEQ comprising first and second transconductance devices, wherein:
in a first mode, an input node of the bimodal LEQ is coupled to an input of the first transconductance device and is selectively coupled to an input of the second transconductance device to increase gain provided by the LEQ for data signals above a predetermined frequency received at the input node; and
in a second mode, the input node is coupled to the input of the second transconductance device and is selectively coupled to the input of the first transconductance device to increase gain provided by the LEQ for data signals above a predetermined frequency received at the input node.

26. The bimodal LEQ of claim 25, wherein the first and second modes comprise a current mode and a voltage mode, and in the current mode an input common mode voltage is near a high rail voltage and in the voltage mode an input common mode voltage is near a low rail voltage.

27. The bimodal LEQ of claim 25, wherein in the first mode, a first filter circuit is coupled to the second transconductance device and provides AC coupling of the second transconductance device above a predetermined frequency, and
in the second mode, a second filter circuit is coupled to the first transconductance device and provides AC coupling of the first transconductance device above the predetermined frequency.

28. The bimodal LEQ of claim 27, wherein the first and second filter circuits comprise tunable filters operable to set the predetermined frequency from a plurality of frequencies.

29. The bimodal LEQ of claim 25, wherein the first transconductance device and the second transconductance device are of complimentary types and are connected in series to drive an output signal from an output node of the bimodal LEQ.

30. The bimodal LEQ of claim 29, wherein the first transconductance device includes an NFET and the second transconductance device includes a PFET, and a drain of the second transconductance device is coupled to a drain of the first transconductance device and the output node.

31. The bimodal LEQ of claim 25, wherein the bimodal LEQ is a differential LEQ to output a differential equalized signal.

32. An integrated circuit comprising a receiver to receive input signals from a signaling pad, wherein:

in a first mode, an input node of the receiver is coupled to an input of a first transconductance device and is selectively coupled to an input of a second transconductance device to increase gain for the input signals above a predetermined frequency received at the input node; and
in a second mode, the input node is coupled to the input of the second transconductance device and is selectively coupled to the input of the first transconductance device to increase the gain for the input signals above a predetermined frequency received at the input node.

33. The integrated circuit of claim 32, wherein the first and second modes respectively comprise a current mode and a voltage mode, and in the current mode an input common mode voltage is near a high rail voltage and in the voltage mode an input common mode voltage is near a low rail voltage.

34. The integrated circuit of claim 32, further comprising a register to store a mode setting to select the first mode or the second mode.

35. The integrated circuit of claim 31 further comprising a level shifter to condition an output signal to a predetermined voltage level irrespective of mode.

36. A method of increasing gain of data signals above a predetermined frequency using a bimodal LEQ comprising first and second transconductance devices, the method comprising:
receiving a control signal to select a first mode or second mode of the bimodal LEQ;
controlling the bimodal LEQ to operate in the selected mode;
receiving the data signal at an input node;
the bimodal LEQ substantially providing gain of the data signal by one of the first and second transconductance devices and not by the other one of the first and second transconductance devices based on the selected mode for a first range of frequencies of the data signal; and
selectively coupling the other one of the first and second transconductance devices to the input node for a second range of frequencies of the data signal to substantially provide gain for the data signal by both the first and second transconductance devices.

37. The method of claim 36 wherein the first and second modes respectively comprise current and voltage modes and in the current mode an input common mode voltage is near a high rail voltage and in the voltage mode an input common mode voltage is near a low rail voltage.

* * * * *